(12) United States Patent
Hamre et al.

(10) Patent No.: US 11,064,339 B2
(45) Date of Patent: Jul. 13, 2021

(54) EMERGENCY EVENT DETECTION AND RESPONSE SYSTEM

(71) Applicant: Aloe Care Health, Inc., New York, NY (US)

(72) Inventors: Lasse Hamre, Brooklyn, NY (US); Raymond Eugene Spoljaric, New York, NY (US); Evan Samuel Schwartz, Brooklyn, NY (US); Ryan Christopher Haigh, Jersey City, NJ (US); Alexander Neville Sassoon, New York, NY (US); Sveinung Kval Bakken, Coral Gables, FL (US)

(73) Assignee: Aloe Care Health, Inc., New York, NY (US)

( * ) Notice: Subject to any disclaimer, the term of this patent is extended or adjusted under 35 U.S.C. 154(b) by 0 days.

(21) Appl. No.: 16/846,370

(22) Filed: Apr. 12, 2020

(65) Prior Publication Data

US 2020/0329358 A1    Oct. 15, 2020

Related U.S. Application Data

(60) Provisional application No. 62/833,522, filed on Apr. 12, 2019.

(51) Int. Cl.
*H04W 4/90* (2018.01)
*G10L 15/08* (2006.01)
*H04M 3/51* (2006.01)

(52) U.S. Cl.
CPC .............. *H04W 4/90* (2018.02); *G10L 15/08* (2013.01); *H04M 3/5116* (2013.01); *G10L 2015/088* (2013.01)

(58) Field of Classification Search
CPC ....... H04W 4/90; H04M 3/5116; G10L 15/08; G10L 2015/088
See application file for complete search history.

(56) References Cited

U.S. PATENT DOCUMENTS

D756,401 S    5/2016   Soldner et al.
D766,959 S    9/2016   Valade et al.
(Continued)

FOREIGN PATENT DOCUMENTS

CN    304473266        1/2018
KR    10-1544960 B1    8/2015

OTHER PUBLICATIONS

PCT International Search Report and Written Opinion, PCT Application No. PCT/US2020/027864, dated Jul. 29, 2020, seven pages.

(Continued)

*Primary Examiner* — Wayne H Cai
(74) *Attorney, Agent, or Firm* — Fenwick & West LLP

(57) ABSTRACT

An emergency event detection and response system detects an occurrence of an event associated with a user and initiates an emergency response flow. A user may be associated with a wearable device and have in his home a base station and portable or stationary wireless devices containing sensors capable of detecting an emergency event. The emergency event may be detected based on voice or non-voice audio input from the user, data monitoring by the wearable device, base station, and/or portable or stationary wireless device, or by physical button press. Responsive to determining that an emergency event has occurred, the system triggers an emergency response flow by notifying a call center and contacting one or more caregivers associated with the user. Caregivers may access a response system application to receive updates regarding the detected emergency and to contact the user and/or a provider associated with the call center.

20 Claims, 3 Drawing Sheets

(56) References Cited

U.S. PATENT DOCUMENTS

| | | | |
|---|---|---|---|
| D773,524 S | 12/2016 | Kisselev et al. | |
| D780,216 S | 2/2017 | Kisselev et al. | |
| D809,542 S | 2/2018 | Lu | |
| 10,397,013 B1 | 8/2019 | Hill et al. | |
| D876,476 S | 2/2020 | Honore et al. | |
| D893,514 S | 8/2020 | Stapleton | |
| D911,355 S | 2/2021 | Kabel-Eckes et al. | |
| 2008/0172232 A1* | 7/2008 | Gurley | G08B 13/1672 704/251 |
| 2010/0286490 A1 | 11/2010 | Koverzin | |
| 2012/0040644 A1 | 2/2012 | Naik et al. | |
| 2013/0065569 A1* | 3/2013 | Leipzig | H04W 8/22 455/416 |
| 2013/0100268 A1 | 4/2013 | Mihailidis et al. | |
| 2014/0253326 A1 | 9/2014 | Cho et al. | |
| 2016/0044482 A1 | 2/2016 | Stephens | |
| 2018/0249315 A1* | 8/2018 | Mehta | H04W 4/029 |
| 2018/0325469 A1 | 11/2018 | Fountaine | |

OTHER PUBLICATIONS

Rahman, M.Z., "Calling Screen App" Dribbble, Dec. 2, 2017, two pages, [Online] [Retrieved on Mar. 22, 2021] Retrieved from the Internet <URL: https://dribbble.com/shots/3990815-Calling-Screen-App>.

United States Ex Parte Quayle Action, U.S. Appl. No. 29/687,923, dated Mar. 29, 2021, eight pages.

Taiwan Intellectual Property Office, Office Action, TW Patent Application No. 109112413, dated Feb. 5, 2021, 14 pages.

\* cited by examiner

EMERGENCY EVENT DETECTION AND RESPONSE SYSTEM

CROSS-REFERENCE TO RELATED APPLICATIONS

This application claims the benefit of U.S. Provisional 62/833,522, filed on Apr. 12, 2019, which is incorporated by reference herein in its entirety.

BACKGROUND

Field

The described embodiments are directed to detection of emergency events, and in particular to detecting and responding to an emergency event impacting a user, and to initiating a response flow to provide assistance to the user.

Related Background

Much of the elderly population live alone in their dwellings. This presents a significant risk that a medical emergency such as a sudden illness, fall, or other injury might occur, rendering the victim unable to obtain rapid assistance—for example, by being able to reach a telephone or attract the attention of a passer-by. Some attempts have been made to respond to this challenge, such as by providing a person with a device that can be physically activated by the person to ask for assistance from a monitoring agency.

SUMMARY

An emergency event detection and response system detects an occurrence of an emergency event associated with a user of the system and initiates an emergency response flow based on the detected emergency. A user of the response system (also referred to herein as a care recipient) may be associated with a wearable device and may have in his or her home a base station and one or more portable or stationary wireless devices containing sensors capable of detecting an emergency event. The emergency event may be detected based on one or more of voice or non-voice audio input from the user, data monitoring by the wearable device, base station, and/or portable or stationary wireless device, or by physical button press. Responsive to detecting that an emergency event has occurred, and, in some embodiments, responsive to confirming the emergency event with the user, the system triggers an emergency response flow by notifying a call center and contacting one or more caregivers associated with the user. Caregivers may access a response system application to receive updates regarding the detected emergency and to contact the user and/or a provider associated with the call center.

DETAILED DESCRIPTION

Figure 1:
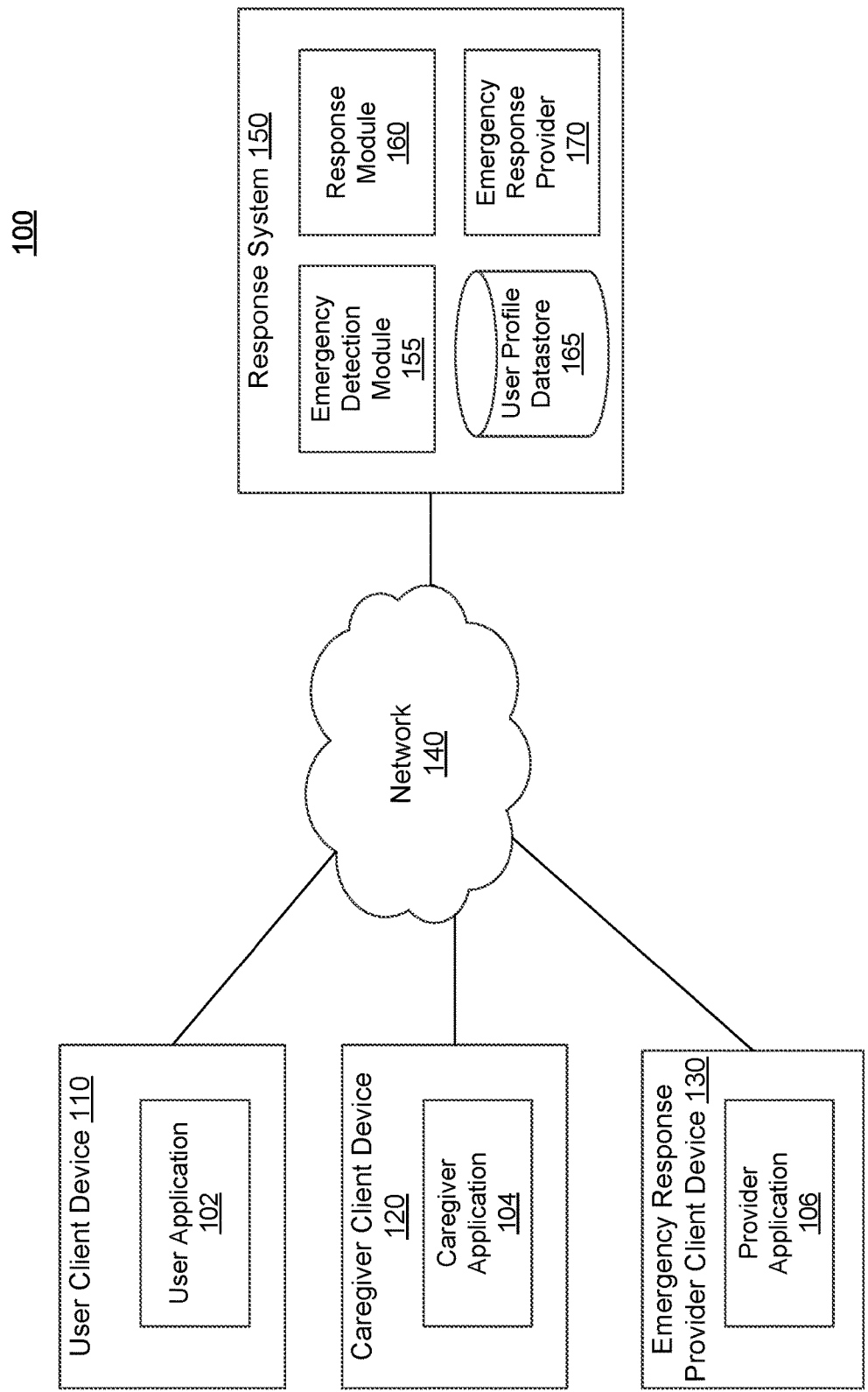
FIG. 1 illustrates a block diagram of an emergency response system, in accordance with an embodiment.

FIG. 1 illustrates a block diagram of an emergency response system 100, in accordance with an embodiment. One or more users, using user client device 110, caregiver client device 120, and emergency response provider client device 130 are in communication via a network 140 with a response system 150. In alternative configurations, different and/or additional components may be included in the emergency response system 100.

The user client device 110, caregiver client device 120, and emergency response provider client device 130 are computing devices capable of receiving passive or active user input as well as transmitting and/or receiving data via the network 140. In one embodiment, the client devices 110, 120, and 130 are conventional computer systems, such as a desktop or laptop computer, configured to implement the methods described here. Alternatively, the client devices 110, 120, and 130 may be other devices having computer functionality, such as a personal digital assistant (PDA), a mobile telephone, a smartphone, a special-purpose device, an Internet of Things (IoT) device, or another suitable device. The client devices 110, 120, and 130 are configured to communicate with the response system 150 via the network 140.

The response system 150 may use any of a plurality of communication standards, protocols, and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11), ZigBee, Z-Wave, low-power wide-area network (LPWAN), Narrowband IoT (NB-IoT), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol. In one embodiment, the components of the emergency response system 100 can alternate between using Wi-Fi and LTE protocols.

In one embodiment, the client devices 110, 120, and 130 execute an application 102, 104, and 106, respectively, that allows the users of the client devices 110, 120, and 130 to interact with the response system 150. For example, the client devices 110, 120, and 130 execute a browser application to enable interaction between the client devices 110, 120, and 130 and the response system 150 through the network 140. In another embodiment, the client devices 110, 120, and 130 interact with the response system 150 through an application programming interface (API) running on a native operating system of the client devices 110, 120, and 130, such as Apple Inc.'s IOS® or Google LLC's ANDROID™ operating systems.

The user client device 110 may be associated with a wearable wireless device (not shown) configured to monitor user health data. In one embodiment, the wearable device includes a back side that contacts the user's skin and a face side including one or more input elements, such as a button, configured to receive user input. For example, the user might push the button if she has cut herself, is feeling faint, or the like. The wearable device may include sensors that allow for collection of user health data, such as a user's heart rate, pulse, activity data, etc. In some embodiments, the wearable device includes one or more sensors, such as an accelerometer and/or a gyroscope, capable of detecting that the user has fallen and notifying the response system 150. The wearable device may include a speaker and/or a microphone capable of receiving voice input and outputting audio to the user of the wearable device.

In some embodiments, the user client device 110 is associated with a base station, one or more wireless devices, and one or more radio frequency (RF) devices (not shown) that detect the occurrence of an event and transmit event data to the response system 150. In one embodiment, the base station is a fixed-location transceiver, and the wireless devices (also referred to herein as smart buttons) are associated with the base station and may be placed through the user's environment (e.g., in a bedroom and/or bathroom of a user's home). The wireless devices may be portable or stationary. For example, in one embodiment, the wireless device may be moved from room to room in the user's house, while in another embodiment, the wireless device is fixed to a surface, such as a wall. The base station and the wireless devices include one or more sensors capable of detecting that a fall or other emergency event has likely occurred. For example, in one embodiment, the base station includes a microphone that can detect noises occurring in the environment in which the base station is located. The base station transmits detected noise data to the response system 150, which compares the detected noises to a noise profile consistent with an emergency event, such as a user falling or glass breaking, to determine whether the emergency event has occurred. Alternatively, in some embodiments, the noise profile comparison is performed locally, such as at the base station, the wireless device, or the user client device 110. Noise profiles consistent with emergency events may be stored by response system 150 and/or user client device 110, and supplemented by the implementer over time.

In some embodiments, the base station further includes a speaker that outputs audio at predefined times and/or in response to an instruction from the response system 150. For example, if the response system 150 detects that an emergency event has occurred (e.g., in response to a button press on the wearable device or detection of audio input that has at least a threshold level similarity to a noise profile of a user falling or glass breaking), the response system 150 instructs the base station to output audio through the speaker. The base station may output a voice prompt asking the user to confirm that an emergency event has occurred. If the base station detects that the user has confirmed the emergency or does not detect a response to the voice prompt, the base station reports the confirmation to the response system 150, triggering an emergency response flow, as discussed below. Conversely, if the base station detects that the user has responded in the negative (i.e., that an emergency event has not occurred), the base station transmits the response to the response system 150, triggering a false alarm flow. In some embodiments, the base station outputs one or more additional voice prompts if a response to the first voice prompt is not detected. For example, the base station may output a second or successive voice prompts at increasingly higher volume and may notify the response system 150 if responses to the prompts are not detected.

The RF device is a radio frequency radar that creates a three-dimensional map of a room, objects, and surroundings. Such environmental monitoring can be used for movement, posture, dynamic or stationary position, as well as breathing levels. In one embodiment, the RF device can be used to determine that an emergency event has likely occurred. For example, the RF device may monitor the received signal strength (RSS) of received radio signals to detect a physical change in the user's environment. The RF device may be trained using training data indicating physical changes (e.g., an RSS reading associated with a user fall), and may compare changes in signal strength to the training data. If the RSS of the received signal deviates from the training data by less than a threshold amount, the RF device notifies the response system 150 that an emergency event has likely occurred.

The response system 150 analyzes data (e.g., using machine learning or artificial intelligence) received from the wearable device, the base station, the wireless devices, and/or the RF devices, and triggers an emergency response flow in response to determining that an emergency event has occurred. In the embodiment shown in FIG. 1, the response system 150 includes an emergency detection module 155, a response module 160, a user profile datastore 165, and an emergency response provider 170. In other embodiments, the response system 150 may include additional, fewer, or different components for various applications. Conventional components such as network interfaces, security functions, load balancers, failover servers, management and network operations consoles, and the like are not shown so as to not obscure the described details of the system architecture.

Each user of the response system 150 is associated with a user profile, which is stored in the user profile datastore 165. A user profile includes declarative information about the user that was explicitly shared by the user and may also include profile information inferred by the response system 150. In one embodiment, a user profile includes multiple data fields, each describing one or more attributes of the corresponding user. Examples of information stored in a user profile include biographic, demographic, and medical information, such as known medical conditions, active prescriptions, details of previously detected emergency events, and the like. The user profile may further store emergency contact information for each user, such as contact information for one or more caregivers and an order in which the caregivers should be contacted in the event that an emergency event is detected. Further, in some embodiments, the response system 150 may make available data stored in the user profile to an emergency response provider client device 130 of an emergency response provider assigned to a detected emergency event.

The emergency detection module 155 detects an occurrence of an emergency event (or lack thereof) based on data received from the wearable device, base station, wireless devices, and/or RF devices. For example, in one embodiment, the emergency detection module 155 detects that an emergency event has occurred responsive to receiving user input through the wearable device, such as a button press (for example, if the user is feeling faint or has cut herself). In another embodiment, emergency event detection may be based on sensor data received from the wireless devices. For example, if a stationary sensor fixed to the wall of a user's bathroom determines that the user has not left the bathroom for 45 minutes, the emergency detection module 155 determines a possible emergency event and triggers the emergency response flow. Emergency event detection may further be triggered by user audio input to the wearable device, the base station, or a wireless device. For example, the emergency detection module 155 may perform voice recognition on user voice input and compare received input to a grammar or language model specific to emergency event detection. Responsive to detecting that the user input indicates a likely emergency, the emergency detection module 155 instructs the response module 160 to initiate an emergency response flow. Still further, the emergency detection module 155 may detect that an emergency event has occurred based on noise data (e.g., non-voice audio input) received from the base station. For example, the emergency detection module 155 may compare received noise data to a known noise profile of an emergency event (such as a user falling or glass breaking) based on previously collected sensor data. Responsive to the noise data matching (i.e., having at least a threshold level of similarity to) the noise profile of the emergency event, the emergency detection module 155 determines that the emergency event has likely occurred. In still other embodiments, an emergency event is detected based on environmental monitoring performed by the RF devices.

In some embodiments, the emergency detection module 155 determines that an emergency event has occurred and instructs the response module 160 to initiate an emergency response flow without prompting the user for confirmation of the emergency. For example, the emergency detection module 155 might detect that the user has pressed a button on the wearable device, has requested assistance through the user application 102, and/or has provided audio input to the base station or wireless device indicative of an emergency (e.g., a scream or yell), or has spoken one or more words on a trigger list (e.g., "Help," "Emergency," "Ouch," etc.). Responsive to determining that one or more of these events has occurred, the emergency detection module 155 automatically triggers the emergency response flow.

In other embodiments, the emergency detection module 155 prompts the user client device 110 and/or the associated wearable device or base station to confirm that an emergency event has occurred before instructing the response module 160 to initiate the emergency response flow. For example, as described above, the base station outputs a voice prompt to the user. In one embodiment, an affirmative answer to the voice prompt indicates that an emergency event has occurred. For example, the voice prompt may ask the user whether the user has fallen, whether the user needs help, whether the user has been hurt, and the like. Alternatively, a negative answer to the voice prompt is indicative of an emergency. For example, the voice prompt may ask the user whether the user is okay. The base station transmits the received audio data to the emergency detection module 155, which analyzes the audio data to determine whether the user responded to the voice prompt. In some embodiments, a human monitor associated with the response system 150 analyzes received data to determine whether an emergency event has occurred (e.g., if the emergency detection module 155 cannot make a definitive determination having at least a threshold level of confidence, which may be selected by the implementer).

In some embodiments, the emergency detection module 155 determines that the user did not respond to the voice prompt within a threshold period of time (e.g., 10 seconds) or that audio data received from the base station is not clearly audible or consistent with a human voice, and instructs the base station to output a second voice prompt asking the user to confirm whether an emergency event has occurred. In some embodiments, the second voice prompt includes the same language as the first voice prompt but is output at a higher volume from the base station. Alternatively, the second voice prompt is output at the same volume as the first voice prompt. The base station transmits received audio data to the emergency detection module 155 to determine whether the user has confirmed an emergency. In one embodiment, the emergency detection module 155 instructs the base station to output one or more additional voice prompts responsive to determining that the user has not responded to the second voice prompt. Alternatively, if the emergency detection module 155 does not detect user confirmation of the emergency or lack thereof, the emergency detection module 155 determines that an emergency event has occurred and triggers the emergency response flow.

The emergency detection module 155 compares received audio data to a grammar or language model specific to emergency event detection to determine whether the user has confirmed an emergency. If the emergency detection module 155 determines that an emergency event has not occurred (e.g., based on audio input by the user confirming that the user has not fallen, does not need help, or the like), the emergency detection module 155 instructs the response module 160 to initiate a false alarm flow.

Responsive to receiving an instruction to trigger the false alarm flow, the response module 160 queries the user profile datastore 165 for contact information for one or more caregivers associated with the user and queries the user (e.g., through audio output on the wearable device, base station, or the user client device 110) to determine whether the user wants to contact one or more of the caregivers. For example, the response module 160 might determine that the user's caregiver is her son and might instruct the base station to output a voice prompt asking the user if she wants to call her son. If the user answers in the affirmative, the response module contacts the user's son (e.g., through the caregiver application 104 or a mobile or VoIP call).

Alternatively, the response module 160 sends a message directly to the caregiver through the caregiver application 104 on the caregiver client device 120. In embodiments in which more than one caregiver is associated with the user, the response module 160 contacts a first caregiver only, more than one caregiver, or all caregivers, depending on user-specified settings. For example, a user might designate her daughter as the first caregiver, her son as the second caregiver, and her sister as the third caregiver, and may instruct the response system 150 to contact her daughter, her daughter and son, or her daughter, son, and sister in the event that either an emergency or a false alarm is detected.

The response module 160 notifies the one or more caregivers 120 through the caregiver application 104 that a false alarm has occurred and enables the caregivers to take one or more actions associated with the false alarm. For example, a caregiver may provide input, through the caregiver application 104, requesting to communicate with the user through the base station or the wearable device. In this way, the caregiver may speak directly to the user without requiring the user to communicate through the user client device 110. Additionally, the caregiver may provide input to the caregiver application 104 to report an emergency event. For example, after speaking with the user, the caregiver might determine that an emergency event has occurred, even if the user input indicated a false alarm. The caregiver may add, through the caregiver application 104, an individual associated with the emergency response provider 170 (such as a human agent, a doctor, or a nurse) to the call between the user and the caregiver, triggering the emergency response flow. In one embodiment, the emergency response provider 170 is a telephone call center. Responsive to receiving caregiver input to add a provider to the call, the response module 160 initiates a conference bridge between the client devices 110, 120, and 130. If the response module 160 determines that the caregiver client device 120 is no longer participating in the call (i.e., the caregiver has hung up), the conference bridge remains active between the user client device 110 and the emergency response provider client device 130 until the call has ended.

If the emergency detection module 155 determines that an emergency event has occurred (e.g., based on audio input or lack of user response to the voice prompt or based on caregiver input), the emergency detecting module 155 instructs the response module 160 to initiate the emergency response flow. The response module 160 contacts the emergency response provider 170 (also referred to herein as a "call center"), which assigns the detected emergency to one or more providers associated with one or more emergency response provider client devices 130. In one embodiment, the emergency response center automatically calls 911 or other emergency or medical services and requests assistance on behalf of the user in response to determining that an emergency event has occurred (for example, if the user did not respond to one or more voice prompts from the base station). Alternatively, the response system 150 initiates a call between the assigned provider and the user. The user may communicate with the provider through the user application 102 on the user client device 110, the wearable device, or the base station, and the provider may communicate with the user through the provider application 106 on the emergency response provider client device 130. The provider may speak to the user to determine the scope of, and appropriate response to, the emergency event. For example, if the emergency response center did not automatically contact an emergency or medical service, the provider may determine whether the user needs medical assistance and/or whether one or more caregivers should be contacted.

After initiating a call between the user and the provider, the response module 160 notifies one or more caregivers of the emergency event through the caregiver application 104 or through a mobile or VoIP call. As described above, in embodiments in which more than one caregiver is associated with a user, the response module 160 notifies the first caregiver, more than one caregiver, or all caregivers. The one or more caregivers can access information about the detected emergency through the caregiver application 104. For example, in one embodiment, the caregiver application 104 includes interface elements allowing a caregiver to message one or more other caregivers, provide input instructing the response system 150 to call an emergency contact of the user (e.g., a neighbor or family member), view the status of a call between the user and the assigned provider, and/or join the call between the user and the provider. The response module 160 updates the status of the emergency response based on input from the user, the provider, or one or more caregivers and generates a feed for display on the caregiver application 104. For example, the feed may notify the caregiver that the response system 150 connected with the user on the base station, that the provider ended a call with the user, that an emergency medical team has been dispatched to the user's house, and the like. After resolution of the emergency event, the response system 150 contacts one or more caregivers through the caregiver application 104 or through a mobile or VoIP call to provide a detailed report of the emergency.

Figure 2:
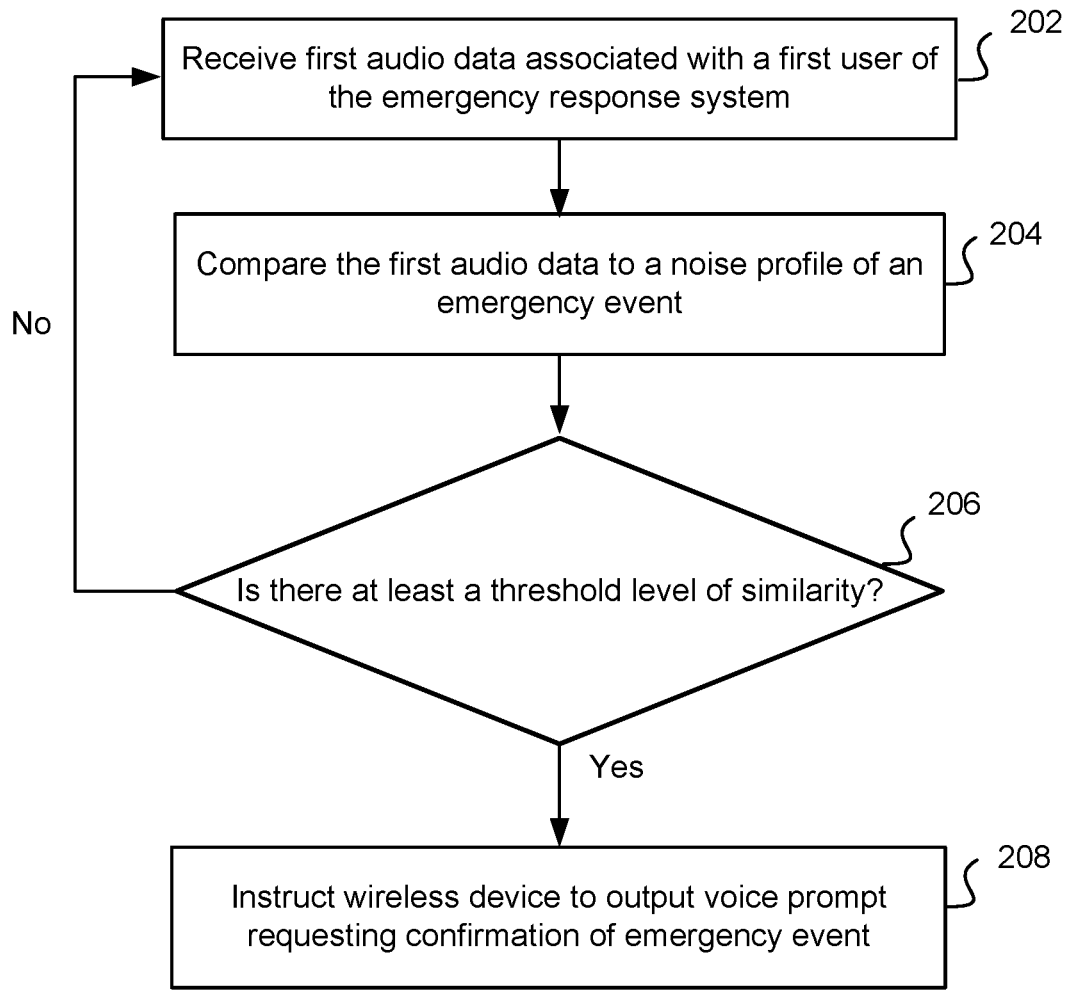
FIG. 2 illustrates a flowchart of a method 200 for emergency event detection and response, in accordance with an embodiment.

FIG. 2 illustrates a flowchart of a method 200 for emergency event detection and response, in accordance with an embodiment. The steps of FIG. 2 are illustrated from the perspective of the response system 150 performing the method 200. However, some or all of the steps may be performed by other entities or components. In addition, some embodiments may perform the steps in parallel, perform the steps in different orders, or perform different steps.

At 202, the response system 150 receives audio data collected by one or more wireless devices associated with a user. In various embodiments, the audio data may be voice data or non-voice audio data. For example, as described above with respect to FIG. 1, the wireless device may be a wearable device, a base station, and/or a portable or stationary wireless device configured to receive passive or active input from the user (e.g., via voice, button push, and the like).

In embodiments where the received audio data is non-voice audio data, the emergency detection module 155 compares 204 the received audio data to a noise profile associated with an emergency event, such as a fall. If the emergency detection module 155 determines 206 that at least a threshold level of similarity exists between the received audio data and the noise profile, the emergency detection module 155 determines that an emergency event has likely occurred. Conversely, if a threshold level of similarity does not exist between the received user data and the noise profile, the emergency detection module 155 determines that the emergency event has likely not occurred and continues to monitor audio data received from the one or more wireless devices. In some embodiments, responsive to the emergency detection module 155 determining that the emergency event has likely not occurred, the response module 160 triggers the false alarm flow. In embodiments where the received audio data is voice input, the emergency detection module 155 performs voice recognition on the input and compares the recognized input to a grammar or language model specific to emergency event detection to determine whether an emergency event has likely occurred.

In embodiments where the emergency detection module 155 determines that the emergency event has likely occurred (e.g., based on voice or non-voice audio data), the response module 160 sends 208 an instruction to the one or more wireless devices (such as the wearable device, base station, and/or the wireless device) to output a voice prompt asking the user to confirm the occurrence of the emergency. In some embodiments, the response system 150 triggers the emergency response flow responsive to receiving audio data from the one or more wireless devices confirming the emergency (e.g., user speech input such as "Help," "I've fallen," "Yes" in response to a voice prompt asking the user if she fell, or "No" in response to a voice prompt asking the user if she is okay). In other embodiments, the emergency response flow is initiated in response to the emergency detection module 155 determining, based on audio data received from the wireless devices or lack of received audio data, that the user has not responded to the voice prompt before a threshold period of time has elapsed (e.g., within 5 seconds of the voice prompt output). Further, in some embodiments, responsive to determining that the user has not responded to the initial voice prompt, the emergency detection module 155 instructs the wireless device to output a second voice prompt requesting confirmation of the emergency event, and triggers the emergency response flow if a user response to the second voice prompt is not detected.

The described embodiment initiated the emergency response flow based on non-voice audio data matching a noise profile of the emergency event (e.g., a fall or glass breaking) or recognized voice audio data matching a language model specific to emergency event detection. In other embodiments, the emergency response flow is triggered manually by the user (e.g., via button push on the wearable device or base station), is based on detection of other non-voice audio data indicative of an emergency (e.g., a scream or yell), and/or is based on the RSS of radio frequency signals.

Figure 3:
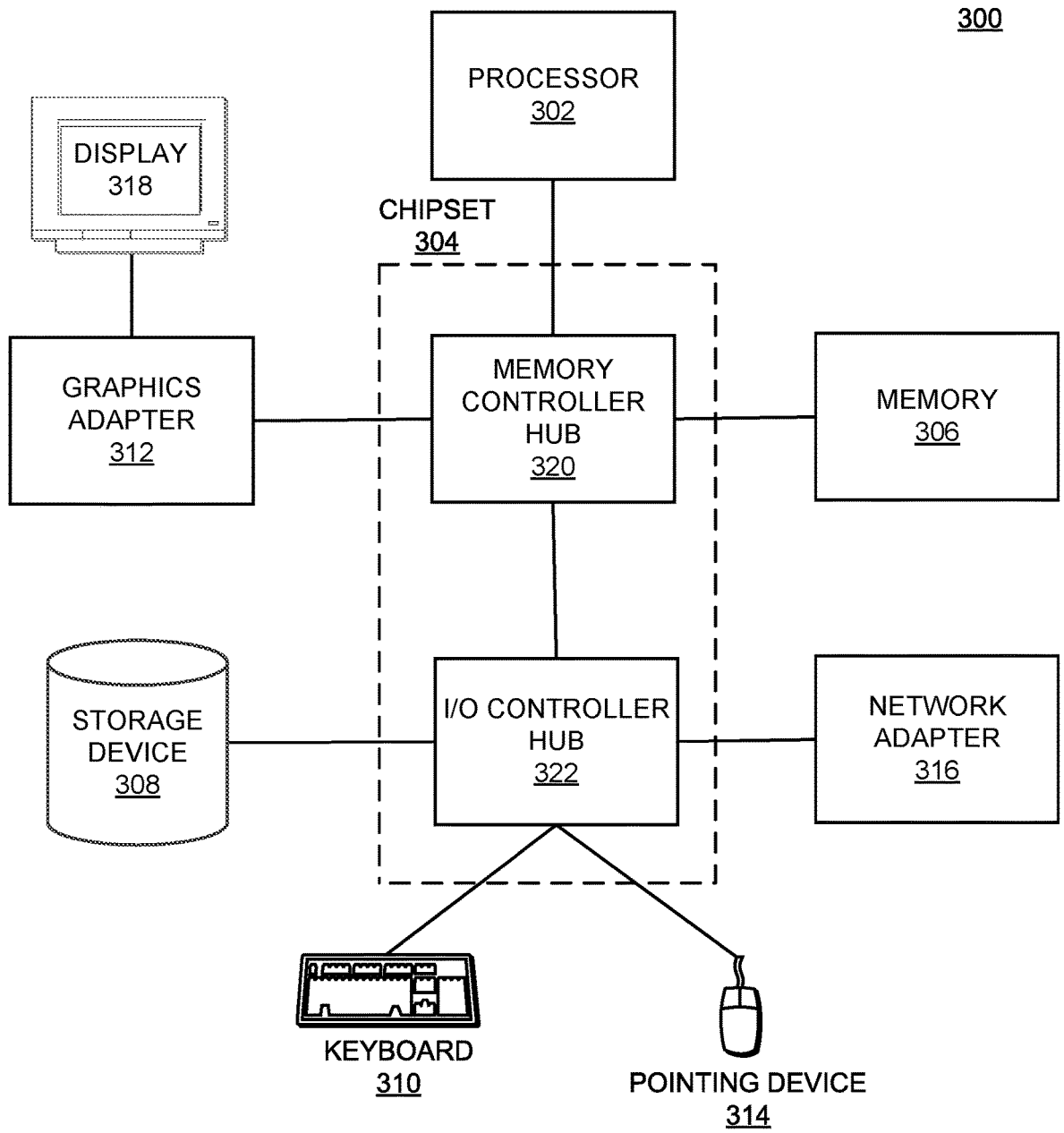
FIG. 3 illustrates a block diagram of a computer system 300 for acting as a client device or response system, in accordance with an embodiment.

The entities shown in FIG. 1 are implemented using one or more computers. FIG. 3 is a block diagram that illustrates a computer system 300 for acting as a client device 110, 120, or 130 or response system 150, according to one embodiment. Illustrated are at least one processor 302 coupled to a chipset 304. Also coupled to the chipset 304 are a memory 306, a storage device 308, a keyboard 310, a graphics adapter 312, a pointing device 314, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The pointing device 314 may be a mouse, track ball, or other type of pointing device, and is used in combination with the keyboard 310 to input data into the computer system 300. The graphics adapter 312 displays images and other information on the display 318. The network adapter 316 couples the computer system 300 to the network 140.

As is known in the art, a computer 300 can have different and/or other components than those shown in FIG. 3. In addition, the computer 300 can lack certain illustrated components. For example, the computer acting as the response system 150 can be formed of multiple blade servers linked together into one or more distributed systems and lack components such as keyboards and displays. Moreover, the storage device 308 can be local and/or remote from the computer 300 (such as embodied within a storage area network (SAN)). The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore, it has also proven convenient at times to refer to these arrangements of operations as modules without loss of generality. The described operations and their associated modules may be embodied in software firmware hardware or any combinations thereof.

Any of the steps operations or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon.

We claim:

1. A computer-implemented method for emergency event detection and response, the method comprising:
   receiving, at an emergency response system, first audio data associated with a first user of the emergency response system and collected by one or more wireless devices;
   determining, based in part on the first audio data, a possible occurrence of the emergency event;
   instructing the one or more wireless devices to output a voice prompt requesting confirmation that the emergency event has occurred;
   transmitting, responsive to determining that the emergency event has occurred based on second audio data received at the one or more wireless devices subsequent to the voice prompt being output, a notification to a caregiver client device of a caregiver specified by the first user;
   initiating a call between the one or more wireless devices and the caregiver client device;
   providing for display on the caregiver client device a prompt enabling the caregiver to add a provider to the call; and
   initiating, responsive to the caregiver selecting the prompt, a conference bridge between the one or more wireless devices, the caregiver client device, and a provider client device.

2. The computer-implemented method of claim 1, wherein determining the possible occurrence of the emergency event comprises:
   comparing the received first audio data to a noise profile associated with the emergency event; and
   responsive to the received first audio data having at least a threshold level of similarity to the noise profile, determining the possible occurrence of the emergency event.

3. The computer-implemented method of claim 1, wherein determining the possible occurrence of the emergency event comprises:
   performing voice recognition on the received first audio data;
   comparing the recognized first audio data to an emergency event language model; and
   determining, based on the comparison, the possible occurrence of the emergency event.

4. The computer-implemented method of claim 1, wherein determining the possible occurrence of the emergency event comprises:
- performing voice recognition on the received first audio data;
- comparing the recognized first audio data to a list of keywords; and
- responsive to the recognized first audio data matching at least one keyword on the list of keywords, determining the possible occurrence of the emergency event.

5. The computer-implemented method of claim 1, further comprising:
- receiving, at the emergency response system, the second audio data collected by the one or more wireless devices; and
- determining, based on the received second audio data that the emergency event has occurred.

6. The computer-implemented method of claim 1, further comprising:
- determining, by the emergency response system, that no response to the voice prompt has been received; and
- instructing the one or more wireless devices to output a second voice prompt requesting a confirmation that the emergency event has occurred, wherein the second audio data includes the confirmation that the emergency event has occurred.

7. The computer-implemented method of claim 1, further comprising:
- determining, by the emergency response system, that no response to the voice prompt has been received, wherein the second audio data is characterized by an absence of the response to the voice prompt.

8. A computer program product for emergency event detection and response, the computer program product stored on a non-transitory computer readable medium, and including executable instructions for causing a processor to carry out steps comprising:
- receiving, at an emergency response system, first audio data associated with a first user of the emergency response system and collected by one or more wireless devices;
- determining, based in part on the first audio data, a possible occurrence of the emergency event;
- instructing the one or more wireless devices to output a voice prompt requesting confirmation that the emergency event has occurred;
- transmitting, responsive to determining that the emergency event has occurred based on second audio data received at the one or more wireless devices subsequent to the voice prompt being output, a notification to a caregiver client device of a caregiver specified by the first user;
- initiating a call between the one or more wireless devices and the caregiver client device;
- providing for display on the caregiver client device a prompt enabling the caregiver to add a provider to the call; and
- initiating, responsive to the caregiver selecting the prompt, a conference bridge between the one or more wireless devices, the caregiver client device, and a provider client device.

9. The computer program product of claim 8, wherein determining the possible occurrence of the emergency event comprises:
- comparing the received first audio data to a noise profile associated with the emergency event; and
- responsive to the received first audio data having at least a threshold level of similarity to the noise profile, determining the possible occurrence of the emergency event.

10. The computer program product of claim 8, wherein determining the possible occurrence of the emergency event comprises:
- performing voice recognition on the received first audio data;
- comparing the recognized first audio data to an emergency event language model; and
- determining, based on the comparison, the possible occurrence of the emergency event.

11. The computer program product of claim 8, wherein determining the possible occurrence of the emergency event comprises:
- performing voice recognition on the received first audio data;
- comparing the recognized first audio data to a list of keywords; and
- responsive to the recognized first audio data matching at least one keyword on the list of keywords, determining the possible occurrence of the emergency event.

12. The computer program product of claim 8, further comprising:
- receiving, at the emergency response system, the second audio data collected by the one or more wireless devices; and
- determining, based on the received second audio data that the emergency event has occurred.

13. The computer program product of claim 8, further comprising:
- determining, by the emergency response system, that no response to the voice prompt has been received; and
- instructing the one or more wireless devices to output a second voice prompt requesting a confirmation that the emergency event has occurred, wherein the second audio data includes the confirmation that the emergency event has occurred.

14. The computer program product of claim 8, further comprising:
- determining, by the emergency response system, that no response to the voice prompt has been received, wherein the second audio data is characterized by an absence of the response to the voice prompt.

15. A system for emergency event detection and response, comprising:
- an emergency detection module, adapted to:
  - receive first audio data associated with a first user of the emergency response system and collected by one or more wireless devices; and
  - determine, based in part on the first audio data, a possible occurrence of the emergency event; and
- a response module, adapted to:
  - receive the determination from the emergency detection module;
  - instruct, responsive to receiving the determination, the one or more wireless devices to output a voice prompt requesting confirmation that the emergency event has occurred;
  - initiate a call between the one or more wireless devices and a caregiver client device of a caregiver specified by the first user;
  - provide for display on the caregiver client device a prompt enabling the caregiver to add a provider to the call; and initiate, responsive to the caregiver selecting the prompt, a conference bridge between the one or more wireless devices, the caregiver client device, and a provider client device.

16. The system of claim 15, further comprising a user profile database, adapted to store declarative information about the first user, the information including biographic, demographic, and medical conditions.

17. The system of claim 15, wherein determining the possible occurrence of the emergency event comprises:
   comparing the received first audio data to a noise profile associated with the emergency event; and
   responsive to the received first audio data having at least a threshold level of similarity to the noise profile, determining the possible occurrence of the emergency event.

18. The system of claim 15, wherein determining the possible occurrence of the emergency event comprises:
   performing voice recognition on the received first audio data;
   comparing the recognized first audio data to an emergency event language model; and
   determining, based on the comparison, the possible occurrence of the emergency event.

19. The system of claim 15, wherein determining the possible occurrence of the emergency event comprises:
   performing voice recognition on the received first audio data;
   comparing the recognized first audio data to a list of keywords; and
   responsive to the recognized first audio data matching at least one keyword on the list of keywords, determining the possible occurrence of the emergency event.

20. The system of claim 15, further comprising:
   determining, by the emergency response system, that no response to the voice prompt has been received; and
   instructing the one or more wireless devices to output a second voice prompt requesting confirmation that the emergency event has occurred.

* * * * *